May 13, 1924.  
S. I. SCHWABACHER  
SHAVING MIRROR  
Filed May 25, 1923  
1,493,709
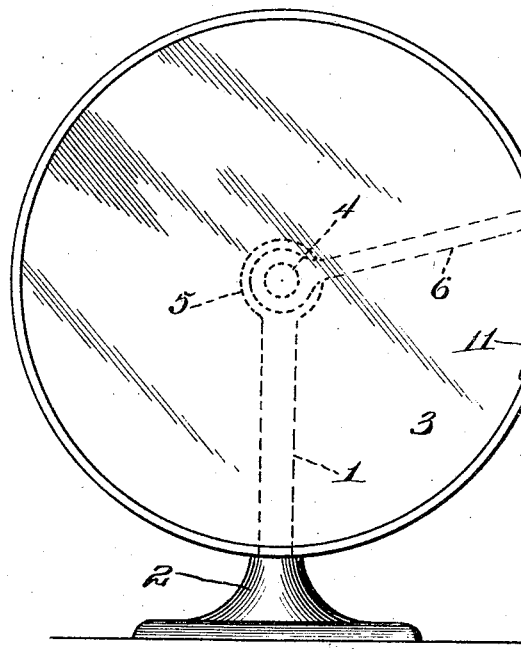
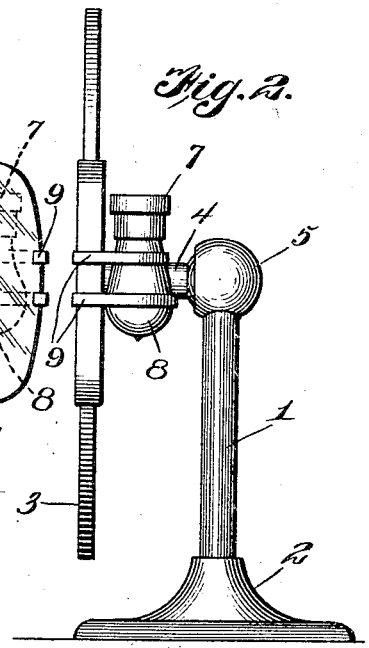
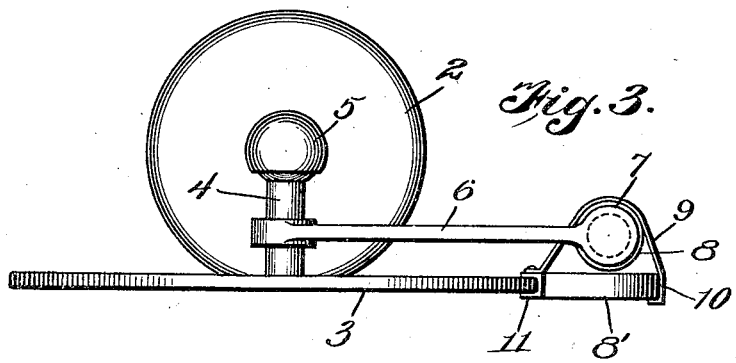
Inventor  
S. I. Schwabacher Patented May 13, 1924.

1,493,709

UNITED STATES PATENT OFFICE.

SAMUEL I. SCHWABACHER, OF SEATTLE, WASHINGTON.

SHAVING MIRROR.

Application filed May 25, 1923. Serial No. 641,455.

*To all whom it may concern:*

Be it known that I, SAMUEL I. SCHWABACHER, a citizen of the United States, residing at Seattle, in the county of King and State of Washington, have invented certain new and useful Improvements in Shaving Mirrors, of which the following is a specification.

This invention relates to improvements in portable mirrors, designed more particularly for use in shaving and like operations, and comprehends the combination of a lighting means with the mirror, with such lighting means adapted to be positioned in and frictionally secured against accidental movement in any radial position on the mirror.

The improved mirror comprises a stand adapted to rest upon any convenient surface, to which through a universal connection, is secured a circular mirror. Mounted for rotation with respect to the mirror, and movable about the axis of the mirror, is a lighting element having means to frictionally engage the edge of the mirror. Thus the lighting element may be shifted to any position radially of the mirror to direct the light toward any particular point as to either side of the face in the shaving operation.

The invention is illustrated in the accompanying drawings, in which:

Fig. 1 is a view in elevation of the improvement.

Fig. 2 is a side view of the same.

Fig. 3 is a plan view of the same.

In the drawings, the mirror support comprises a standard 1, which may, if desired, be provided with a base 2 to adapt the mirror for resting upon any suitable support, though it is obvious that the standard 1 may form part of a wall fixture or be terminally provided with a clamp to adapt the mirror for various uses.

The mirror proper 3 is centrally provided with a rearwardly extended arm 4, having a universal connection at 5 with the upper end of the standard 1, whereby the mirror may be arranged in any position relative to the standard. An arm 6 is mounted for rotation about the arm 4, and at its free end is provided with a socket 7 to receive an incandescent lamp 8, the circuiting wires for which are not shown. A translucent or light diffusing section 8' is secured to overlie the lamp 8, being preferably held in the plane of the mirror by bands 9 encircling the light and secured to an edge frame 10 of the translucent member. The translucent section is formed on the edge next the mirror in substantial coincidence with the curvature of such mirror edge, and the frame 10 is formed in this inner portion of a substantial U-shape 11, to more or less frictionally embrace the edge of the mirror.

From the above, it will be apparent that the translucent member and light together, may be moved to any radial position with respect to the mirror, and hence the light may be directed with advantage to any particular point. For example, in the use of the mirror for shaving, the light may be directed to one side or other of the face, or located in other convenient positions to cause the light to shine directly upon the part being operated upon.

Obviously the light may be moved by merely sliding the same about the edge of the mirror, the frictional cooperation of the part 11 with the edge of the mirror serving to hold the light in any desired position.

What I claim is:

1. The combination with a mirror and its support, of a lighting element movable relative to the mirror, a translucent light diffusing member carried by the lighting element, and means to hold said member in engagement with the edge of the mirror during the movement of the lighting element relative to the mirror.

2. A support, a mirror having an arm connected for universal movement on said support, a rod projecting from said arm, a light source carried by the rod, and a translucent section carried by the light source and disposed in the plane of the mirror, said translucent section having an edge formed to slidably and frictionally embrace the edge of the mirror.

3. A circular mirror, a support therefor, a lighting member movably mounted on the support, and a frame slidably engaging the edge of the mirror and movable with the lighting member, said frame having a light diffusing section.

4. A circular mirror, a support therefor, a lighting member movably mounted on the support, and a frame slidably engaging the edge of the mirror and movable with the lighting member, said frame having a light diffusing section disposed in the plane of the mirror.

In testimony whereof I affix my signature in the presence of two witnesses.

SAMUEL I. SCHWABACHER.

Witnesses:
 HELEN M. CROWLEY,
 LOUIS A. SCHWABACHER.